United States Patent

Mukaida et al.

[11] 4,132,827
[45] Jan. 2, 1979

[54] MAGNETIC RECORDING SUBSTANCE

[75] Inventors: Yoshito Mukaida; Masaaki Fujiyama; Shigeo Komine; Masaaki Igarashi; Nobutaka Yamaguchi; Shinobu Iida; Akira Kasuga, all of Odawara, Japan

[73] Assignee: Fuji Photo Film Co., Ltd., Minami-ashigara, Japan

[21] Appl. No.: 760,269

[22] Filed: Jan. 18, 1977

[30] Foreign Application Priority Data

Jan. 20, 1976 [JP] Japan ................ 51/4583

[51] Int. Cl.$^2$ ............ H01F 10/02; B32B 27/20
[52] U.S. Cl. ................. 428/329; 252/62.54; 252/62.58; 427/48; 428/408; 428/900
[58] Field of Search ........ 252/62.54, 62.58; 427/48; 428/900, 408, 329

[56] References Cited

U.S. PATENT DOCUMENTS

| Re. 28,866 | 6/1976 | Haefele et al. ........... 252/62.54 X |
| 2,734,033 | 2/1956 | Menard ................... 252/62.54 |
| 2,772,761 | 12/1956 | Janson .................... 252/62.54 X |
| 3,262,812 | 7/1966 | Falk ........................ 252/62.54 X |
| 3,274,111 | 9/1966 | Sada et al. ................ 252/62.54 |
| 3,320,090 | 5/1967 | Graubart ................... 428/118 X |
| 3,597,273 | 8/1971 | Akashi et al. ............. 252/62.54 X |
| 3,647,539 | 3/1972 | Weber ..................... 252/62.54 X |
| 3,689,317 | 9/1972 | Akashi et al. ............. 428/900 X |
| 3,726,714 | 4/1973 | Haines .................... 252/62.54 X |
| 4,048,375 | 9/1977 | Loewenberg et al. ...... 428/900 X |
| 4,049,871 | 9/1977 | Ogawa et al. ............. 428/900 X |

Primary Examiner—Harold Ansher
Attorney, Agent, or Firm—Armstrong, Nikaido, Marmelstein & Kubovcik

[57] ABSTRACT

In a magnetic recording substance comprising a non-magnetic support and a magnetic recording layer provided on the support, carbon black having a surface area of at least 700 m$^2$/g and an oil absorption of at least 300 ml (DBP)/100 g is contained in the magnetic layer thereby lowering the surface electric resistance without deteriorating the characteristics of the magnetic recording layer.

9 Claims, 3 Drawing Figures

MAGNETIC RECORDING SUBSTANCE

BACKGROUND OF THE INVENTION

1. Field of the Invention

This invention relates to a magnetic recording substance and more particularly, it is concerned with a magnetic recording medium in which the surface electric resistance of a magnetic layer is lowered without deteriorating the properties of the magnetic recording layer.

2. Description of the Prior Art

Generally, unless the surface electric resistance of a magnetic recording substance is lowered, static electricity is generated and accumulated by friction between tapes or a tape and pole in a tape travelling system, which absorbs dusts in the air and, in extreme cases, causes electric discharge and noise in sound or in a monitor picture.

Up to the present time, there have been proposed various methods for lowering the electric resistance of magnetic recording media, such as (1) by adding hygroscopic surfactants and (2) by adding carbon black. However, the first method (1) using surfactants has disadvantages that a magnetic layer tends to soften and to creak under a high humidity and the second method (2) comprising adding carbon black has also disadvantages that it is necessary to add carbon black in an amount of 7% by weight or more to a magnetic material and there thus takes place lowering of the filling degree of a magnetic material per unit volume of a magnetic recording layer and deterioration of the surface smoothness of a magnetic recording layer, resulting in decrease of the signal output and increase of the noise level. In the second method, moreover, dispersion is excessively carried out in a ball mill and, consequently, the surface electric resistance is rather increased.

We, the inventors have made various studies to improve the above described second method comprising adding carbon black and consequently have reached the present invention.

SUMMARY OF THE INVENTION

It is an object of the present invention to provide a magnetic recording substance having a magnetic layer with a decreased surface electric resistance.

It is another object of the present invention to provide a magnetic recording medium having a magnetic layer in which carbon black is incorporated.

These objects can be attained by a magnetic recording substance comprising a non-magnetic support and a magnetic recording layer provided thereon containing carbon black having a surface area of at least 700 $m^2/g$ and an oil absorption of at least 300 ml (dibutyl phthalate)/100 g.

BRIEF DESCRIPTION OF THE DRAWING

The accompanying drawings are to illustrate the principle and merits of the invention in more detail.

DETAILED DESCRIPTION OF THE INVENTION

Figure 1A:
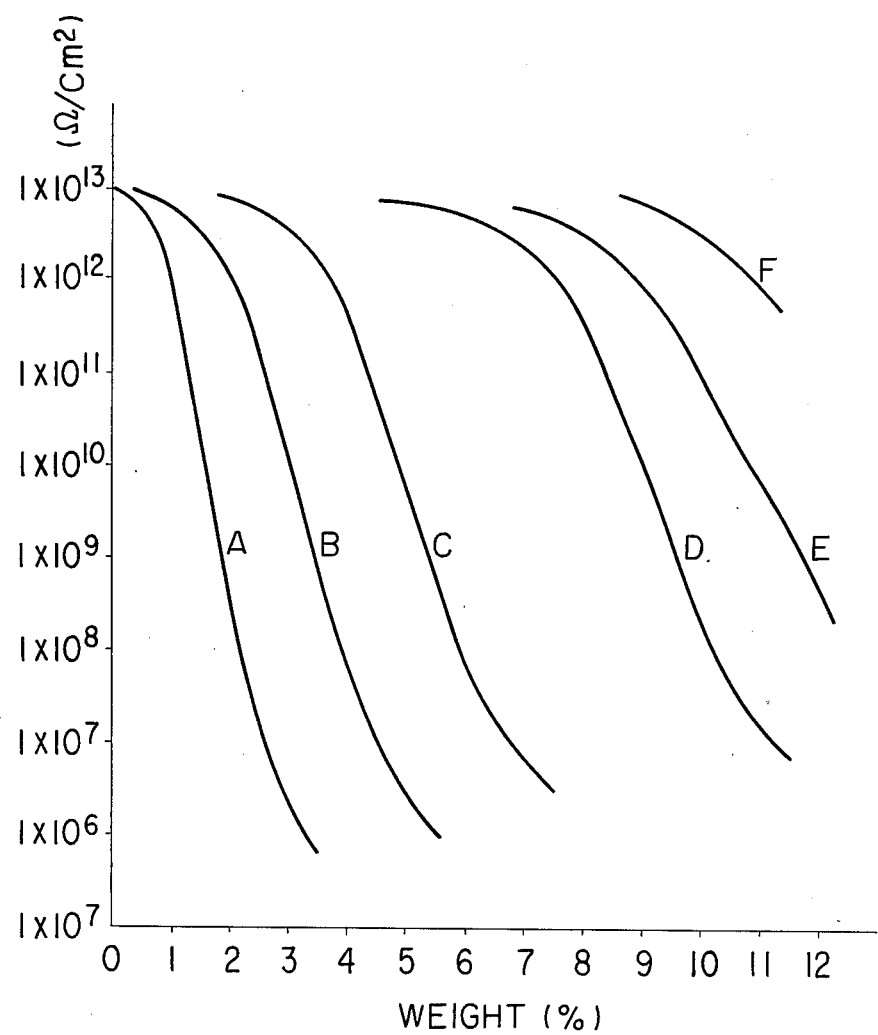
FIG. 1 (a) is a graph showing the relation between the quantity of carbon black (abscissa, % by weight based on magnetic material) and the surface electric resistance (ordinate, $\Omega/cm^2$), FIG. 1 (b) is a graph showing the relation between the quantity of carbon black (abscissa, % by weight based on magnetic material) and the level of video sensitivity and noise (ordinate, dB)

Carbon black hitherto used in the carbon black addition method has an oil absorption of 50 to 250 ml (DBP)/100 g and a surface area of 50 to 400 $m^2/g$. This oil absorption is defined by ml of DBP is added to 100 g of a pigment powder little by little and the state of the pigment is viewed with kneading to find a point at which it is changed from a dispersed state to a massive state, and the surface area is defined by a nitrogen absorption area. For example, acetylene black: 230 ml(DBP)/100 g, 70 $m^2/g$; furnace black: 120 ml (DBP)/100 g, 180 $m^2/g$ and channel black: 150 ml (DBP)/100 g, 400 $m^2/g$.

According to the present invention, there is provided a magnetic recording substance comprising a non-magnetic support and a magnetic recording layer provided on the non-magnetic support, the magnetic recording layer containing carbon black having a surface area of 700 $m^2/g$ or more and an oil absorption of 300 ml (DBP)/100 g or more.

The quantity of this carbon black is generally 0.5% by weight or more, preferably 1% or more to the magnetic material and the preferable ranges of the surface area and oil absorption are respectively 900 $m^2/g$ or more and 320 to 400 ml (DBP)/100 g or more. Furthermore, this carbon black has generally a particle size of about 20 m$\mu$.

The carbon black of the present invention is considerably different from that of the prior art in surface area and oil absorption as described above. That is to say, some large surface area carbon blacks have hitherto been known and, in the channel blacks of Columbia Carbon Co. (USA), for example, ROYAL SPECTRA, NEO SPECTRA MARK I, NEO SPECTRA MARK II and NEO SPECTRA AG have respectively surface areas of 1125, 1065, 906 and 900 $m^2/g$, but their oil absorptions are all small, i.e., 229, 219, 190 and 169 ml (DBP)/100 g. The commonly used carbon blacks have large surface areas only and the carbon black having a large surface area and large oil absorption according to the present invention has not been used for the purpose of lowering the surface electric resistance of a magnetic layer.

According to the present invention, there are obtained the following advantages or merits:

(1) The electric resistance can be lowered to a desired level by the addition of a much smaller amount of carbon black as compared with the prior art carbon blacks.

(2) Consequently, the signal output is increased.

(3) The surface of a magnetic recording layer can be made smooth to lower the noise level.

(4) The increase of the electric resistance due to ball milling can be suppressed.

(5) The antistatic effect is remarkable since the electric resistance can greatly be decreased in the case of adding a same quantity.

The carbon black of the present invention gives a very low surface electric resistance even when added in the same amount as the prior art carbon black as described above. This is possibly due to the fact that the carbon black particles of the present invention are porous through observation using an electron microscope.

Examination of this carbon black in more detail shows that there are some graphite crystals therein. The above described advantages are considered to be given by this characteristic structure.

Processes for preparing magnetic coating compositions used in the present invention are described in detail in, for example, Japanese Patent Publication Nos. 15/1960, 26794/1964, 186/1968, 28043/1972, 28045/1972, 28046/1972, 28048/1972, 31445/1972, 11162/1973, 21331/1973 and 33683/1973 and Russian Patent No. 308,033. These magnetic coating compositions contain predominantly ferromagnetic powders, binders and coating solvents, optionally with dispersing agents, lubricants, abrasives and antistatic agents.

Suitable binders which can be used in the present invention include hitherto known thermoplastic resins, thermosetting resins and mixtures thereof.

Useful examples of the ferromagnetic fine powders which can be used in the present invention are, for example, $\gamma$-$Fe_2O_3$, Co-doped $\gamma$-$Fe_2O_3$, $Fe_3O_4$, Co-doped $Fe_3O_4$, Berthollide compounds of $\gamma$-$Fe_2O_3$ and $Fe_3O_4$ ($FeO_x$: $1.33<x<1.50$), Co-doped Berthollide compounds of $\gamma$-$Fe_2O_3$ and $Fe_3O_4$ ($FeO_x$: $1.33<x<1.50$), $CrO_2$, Co—Ni—P alloys, Co—Ni—Fe alloys, Co—Ni—Fe—B alloys, Fe—Ni—Zn alloys, Fe—Mn—Zn alloys, Fe—Co—Ni—P alloys and Ni-Co alloys, as described in Japanese Patent Publication Nos. 14090/1969, 18372/1970, 22062/1972, 22513/1972, 28466/1971, 38755/1971, 4286/1972, 12422/1972, 17284/1972, 18509/1972, 18573/1972, 10307/1964 and 39639/1973 U.S. Pat. Nos. 3,026,215, 3,031,341, 3,100,194, 3,242,005, 3,389,014, British Patent Nos. 752,659, 782,762 and 1,007,323, French Patent No. 1,107,654 and West German Patent OLS No. 1,281,334.

The ferromagnetic fine powders have a particle size of about 0.2 to 1 microns in length with a length to width ratio of 1:1 to 20:1.

Suitable thermoplastic resins are those which have a softening point of about 150° C. or lower, a mean molecular weight of about 10,000 to 200,000 and a degree of polymerization of the order of about 100 to 2,000, for example, vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, urethane elastomers, polyvinyl fluoride, vinylidene chloride-acrylonitrile copolymers, butadiene-acrylonitrile copolymers, polyamide resins, polyvinyl butyral, cellulose derivatives such as cellulose acetate butyrate, cellulose diacetate, cellulose triacetate, cellulose propionate, cellulose nitrate and the like, styrene-butadiene copolymers, polyester resins, chlorovinyl ether-acrylate copolymers, amino resins, various synthetic rubber based thermoplastic resins and mixtures thereof. Examples of these resins are described in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972 and 27886/1973, U.S. Pat. Nos. 3,144,352, 3,419,420, 3,499,789, 3,713,887, etc.

Suitable thermosetting resins have a molecular weight of about 200,000 or less as a coating solution, and when heated after coating and drying, the molecular weight becomes infinity due to reaction such as condensation, addition and the like. Of these resins, preferred resins are those which do not soften or melt before the resin thermally decomposes. Representative examples of these resins are phenol resins, epoxy resins, polyurethane hardening type resins, urea resins, melamine resins, alkyd resins, silicone resins, acryl based reactive resins, epoxy-polyamide resins, mixtures of high molecular weight polyester resins and isocyanate prepolymers, mixtures of methacrylic acid salt copolymers and diisocyanate prepolymers, mixtures of polyesterpolyols and polyisocyanates, urea-formaldehyde resins, mixtures of low molecular weight glycols, high molecular weight diols and triphenylmethane triisocyanates, polyamide resins and mixtures thereof, etc. Examples of these resins are described in, for example, Japanese Patent Publication Nos. 8103/1964, 9779/1965, 7192/1966, 8016,1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28922/1972, U.S. Pat. Nos. 3,144,353, 3,320,090, 4,437,510, 3,597,273, 3,781,210, 3,781,211, etc. These binders can be used individually or in combination with each other and other additives can be added to the binders. The mixing ratio by weight of a ferromagnetic powder and binder is 10 to 400 parts by weight, preferably 30 to 200 parts by weight of the binder to 300 parts by weight of the ferromagnetic powder.

In addition to the above described binder and ferromagnetic fine powder, other additives such as dispersing agent, lubricants, abrasives, antistatic agents and the like can be added to the magnetic recording layer.

The magnetic recording layer is formed by dissolving or dispersing the above described composition in an organic solvent and then coating the resulting solution or dispersion onto a non-magnetic support.

The non-magnetic support can have a thickness of about 3 to 50 $\mu$m, preferably 10 to 40 $\mu$m. Suitable materials which can be used for producing the support are polyesters such as polyethylene terephthalate, polyethylene-2,6-naphthalate and the like, polyolefins such as polypropylene and the like, cellulose derivatives such as cellulose triacetate, cellulose diacetate and the like, polycarbonates, etc.

The magnetic recording layer can be coated on a support using coating methods such as air doctor coating, blade coating, air knife coating, squeeze coating, dip coating, reverse roll coating, transfer roll coating, gravure coating, kiss coating, cast coating, spray coating and the like and other coating methods can be used. These methods are described in *Coating Kogaku* (Coating Engineering), page 253 to 277, published by Asakura Shoten, Tokyo (Mar. 20, 1971).

The coating thickness is ordinarily 0.5 to 10 microns, preferably 0.8 to 6 microns on dry base.

Typical organic solvents which can be used in the present invention include ketones such as acetone, methyl ethyl ketone, methyl isobutyl ketone, cyclohexanone and the like, alcohols such as methanol, ethanol, propanol, butanol and the like, esters such as methyl acetate, ethyl acetate, butyl acetate, ethyl lactate, glycol monoethyl ether acetate and the like, ethers and glycol ethers such as diethyl ether, glycol monoethyl ether, glycol dimethyl ether, dioxane and the like, aromatic hydrocarbons such as benzene, toluene, xylene and the like, chlorinated hydrocarbons such as methylene chloride, ethylene chloride, carbon tetrachloride, chloroform, ethylene chlorohydrin, dichlorobenzene and the like, tetrahydrofuran, dimethyl sulfoxide, etc. and these solvents can be used individually or in combination with each other.

The present invention will be explained in detail with reference to the following examples. It will be obvious to one skilled in the art that various changes and modifications can be made in the components, ratios, operational order and the like without departing from the spirit of the present invention. Therefore, the present invention should not be construed as being limited to the following examples. All parts, percents, ratios and the like are by weight unless otherwise indicated.

EXAMPLE 1

Onto a polyethylene terephthalate base having a thickness of $22\mu$ was coated a coating liquor having the following composition to give a thickness of $6\mu$ on dry base, dried, subjected to supercalendering treatment in an analogous manner to the ordinary video tape production process and then slit in a width of ½ inch to assess various properties.

EXAMPLE 2

Figure 2:
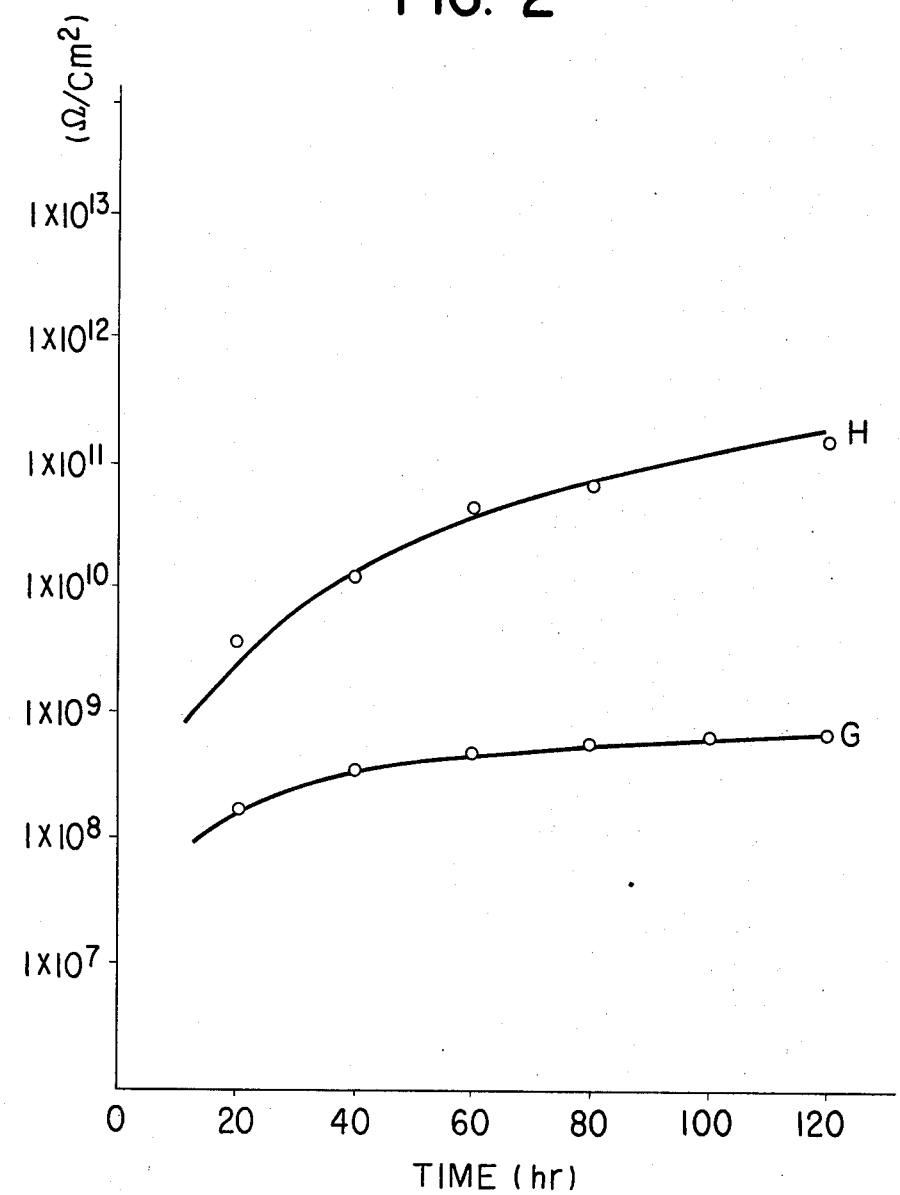
FIG. 2 is a graph showing the relation between the dispersion time of a coating composition (abscissa, hour) and the surface electric resistance (ordinate, $\Omega/cm^2$).

Onto a polyethylene terephthalate base having a thickness of $22\mu$ was coated a coating liquor having the following composition and processed in an analogous manner to Example 1 to obtain a magnetic tape. In this example, the magnetic tapes were prepared with varying the dispersing time to seek a relation between the dispersion time (abscissa, hour) and the electric resistance of the magnetic layer (ordinate, $\Omega/cm^2$) as shown in FIG. 2.

Table 2

| Composition | Sample G | H |
|---|---|---|
| $\gamma$-Fe$_2$O$_3$ | 300 parts | 300 parts |
| Vinyl Chloride/Vinyl Acetate Copolymer | 65 parts | 65 parts |
| Nitrile Rubber | 10 parts | 10 parts |
| Silicone Oil | 0.5 parts | 0.5 parts |
| Solvent (Butyl Acetate) | Suitable | Suitable |
| Carbon Black | | |
| Oil Absorption ml(DBP)/100g | 350 | 150 |
| Surface Area m$^2$/g | 1050 | 390 |
| Quantity Added % by weight to magnetic material | 3.7 | 9 |

Table 1

| Composition Magnetic Material | Sample | | | | | |
|---|---|---|---|---|---|---|
| | A | B | C | D | E | F |
| | $\gamma$-Fe$_2$O$_3$ 150 parts | $\gamma$-Fe$_2$O$_3$ 300 parts | $\gamma$-Fe$_2$O$_3$ 150 parts | $\gamma$-Fe$_2$O$_3$ 300 parts | $\gamma$-Fe$_2$O$_3$ 300 parts | $\gamma$-Fe$_2$O$_3$ 300 parts |
| Vinyl Chloride/ | Fe$_3$O$_4$ 150 parts | | Fe$_3$O$_4$ 150 parts | | | |
| Vinyl Acetate Copolymer | 65 parts | 65 parts | 65 parts | 65 parts | 65 parts | 65 parts |
| Carbon black | | | | | | |
| Oil Absorption (DBP)/100 g | 350 | 350 | 150 | 150 | 140 | 110 |
| Surface Area m$^2$/g | 1050 | 1050 | 390 | 390 | 270 | 120 |
| Nitrile Rubber | 10 parts | 10 parts | 10 parts | 10 parts | 10 parts | 10 parts |
| Silicone Oil | 0.5 parts | 0.5 parts | 0.5 parts | 0.5 parts | 0.5 parts | 0.5 parts |

Figure 1B:
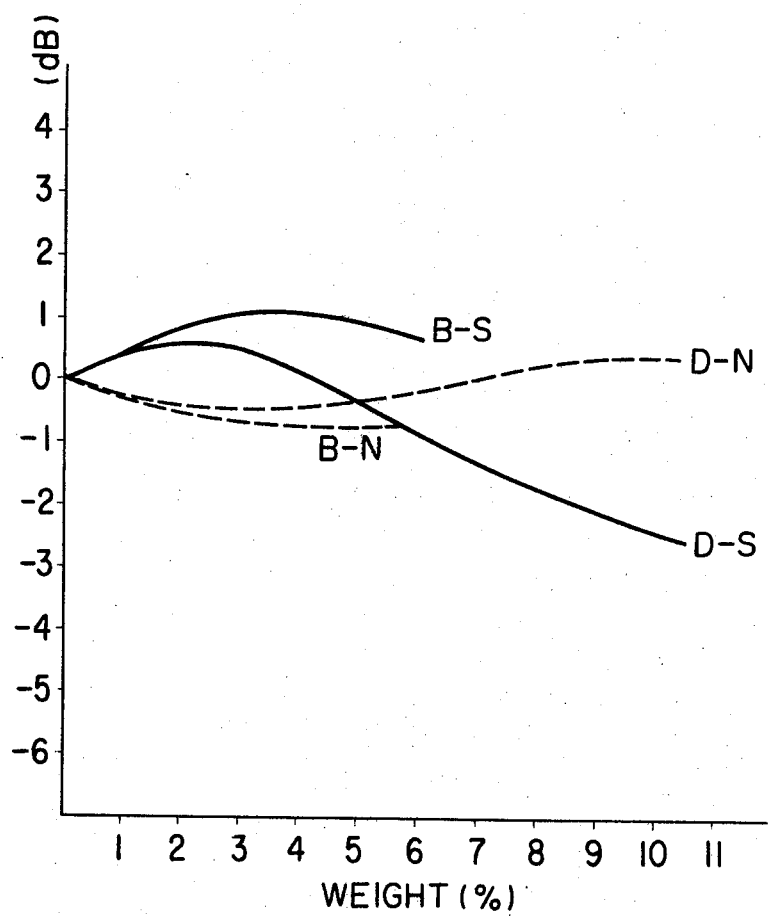

These results are shown in FIG. 1 (a) as a relationship of the surface electric resistance (ordinate, $\Omega/cm^2$) to the quantity of carbon black added (abscissa, % by weight, based on magnetic material). It is apparent therefrom that, in the case of the present invention (Sample Nos. A and B), the quantity of carbon black in a proportion of one part to several parts of the prior art (Sample Nos. C to F) is sufficient to lower the electric resistance to the same value. When the video sensitivity (Sample No. B: Curve BS; Sample No. D: Curve DS) and noise level (Sample No. B: Curve BN; Sample No. D: Curve DN) were examined as to these tapes (Sample Nos. B and D) using a ½ inch helical VTR (NV-3120 type, manufactured by Matsushita Electric Industrial Co., Ltd., there were obtained results as shown in FIG. 1 (b) wherein abscissa; quantity of carbon black added (% by weight to magnetic material and ordinate: level (dB) of properties. The present invention is also more excellent in this respect. In the present invention, in particular, a low electric resistance is obtained with a small amount of carbon black and even if a large amount of carbon black is added, the signal output is not deteriorated and the noise is not increased to an undue degree. As described above, according to the present invention, a high signal output can be obtained with a low noise level, which is apparently due to the very excellent surface smoothness of the tape.

In the case of the tape of the prior art (Sample No. H), the surface electric resistance was increased by about $10^2$ times with the increase of the ball mill dispersion time, while in the present invention (Sample No. G), it was within a range of 10 times only. This means that according to the present invention, it is possible to lengthen the dispersion time in a ball mill, thus obtaining magnetic layer in which a magnetic material is well dispersed.

EXAMPLE 3

| | |
|---|---|
| $\gamma$-Fe$_2$O$_3$ | 300 parts |
| Nitrocellulose | 80 parts |
| Nitrile Rubber | 10 parts |
| Lecithin | 3 parts |
| Silicone Oil | 0.5 parts |
| Solvent (MEK/MIBK = 1/1) | 600 parts |
| (MEK = Methyl Ethyl Ketone, MIBK = Methyl Isobutyl Ketone) | |

To the above described composition was added 25 parts of carbon black as shown in Table 3, kneaded adequately and dispersed to prepare a coating liquor. The thus resulting coating liquor was applied to a polyethylene terephthalate film having a thickness of $22\mu$ to give a thickness of $5.5\mu$ on dry base and then dried to prepare a magnetic tape. The surface electric resistances of the magnetic tapes obtained in this way were measured to obtain results tabulated below.

Table 3

| Sample No. | Carbon Black | Surface Area $m^2/g$ | Oil Absorption ml (DBP)/100g | Surface Electric Resistance /$cm^2$ |
| --- | --- | --- | --- | --- |
| 3-1 | Royal SPECTRA | 1125 | 229 | $4.5 \times 10^9$ |
| 3-2 | NEO SPECTRA AG | 900 | 169 | $3.2 \times 10^9$ |
| 3-3 | SUPER SPECTRA | 742 | 185 | $9.0 \times 10^8$ |
| 3-4 | SUPER BA | 695 | 145 | $8.5 \times 10^8$ |
| 3-5 | CONDUCTEX 950 | 245 | 175 | $9.0 \times 10^7$ |
| 3-6 | CONDUCTEX SC | 200 | 110 | $2.2 \times 10^7$ |
| 3-7 | REERLESS 155 | 130 | 55 | $5.0 \times 10^8$ |
| 3-8 | AKZO Co. EC Carbon | 1050 | 350 | $4.0 \times 10^4$ |
| 3-9 | Mixture of 3-6 and 3-8 with 1:1 by weight | — | — | $3.2 \times 10^5$ |

Note: 3-8: Carbon Black of the present invention Other Carbon Blacks: Commercial Names, Manufactured by Columbia Carbon Co.

It will clearly be understood from these results that the carbon black used in the present invention is more excellent in the effect of lowering the surface electric resistance as compared with other carbon blacks having the same surface area.

What is claimed is:

1. A magnetic recording medium comprising a non-magnetic support and a magnetic recording layer provided thereon containing at least 0.5% by weight based on the magnetic material in the magnetic recording layer of carbon black having a surface area of at least 700 $m^2/g$ and oil absorption of at least 300 ml (dibutyl phthalate)/100 g.

2. The magnetic recording medium of claim 1, wherein the non-magnetic support is of a material selected from the group consisting of polyesters, polyolefins, cellulose derivatives and polycarbonates.

3. The magnetic recording medium of claim 1, wherein said carbon black has a surface area of at least 900 $m^2/g$ and an oil absorption of at least 400 ml (dibutyl phthalate)/100 g.

4. The magnetic recording medium of claim 1, wherein the amount of carbon black is at least 1% by weight.

5. The magnetic recording medium of claim 1, wherein the carbon black has a particle size of about 20 m$\mu$.

6. The magnetic recording medium of claim 1, wherein the thickness of said magnetic recording layer is from 0.5 to 10$\mu$.

7. The magnetic recording medium of claim 1, wherein the magnetic recording layer comprises a ferromagnetic fine powder and binder.

8. The magnetic recording medium of claim 7, wherein the ferromagnetic fine powder is selected from the group consisting of fine powders of $\gamma$-$Fe_2O_3$, Co-doped $\gamma$-$Fe_2O_3$, $Fe_3O_4$, Co-doped $Fe_3O_4$, Berthollide compounds of $\gamma$-$Fe_2O_3$ and $Fe_3O_4$, Co-doped Berthollide compounds of $\gamma$-$Fe_2O_3$ and $Fe_3O_4$, $CrO_2$, Co—Ni—P alloys, Co—Ni—Fe alloys, Co—Ni—Fe—B alloys, Fe—Ni—Zn alloys, Fe—Mn—Zn alloys, Fe—Co—Ni—P alloys and Ni—Co alloys.

9. The magnetic recording medium of claim 3, wherein the ratio of binder to ferromagnetic fine powder is 10 to 400 parts/300 parts.

* * * * *